Sept. 2, 1941.  C. V. GARDINER  2,254,890
BRAKING SYSTEM
Filed Feb. 1, 1940
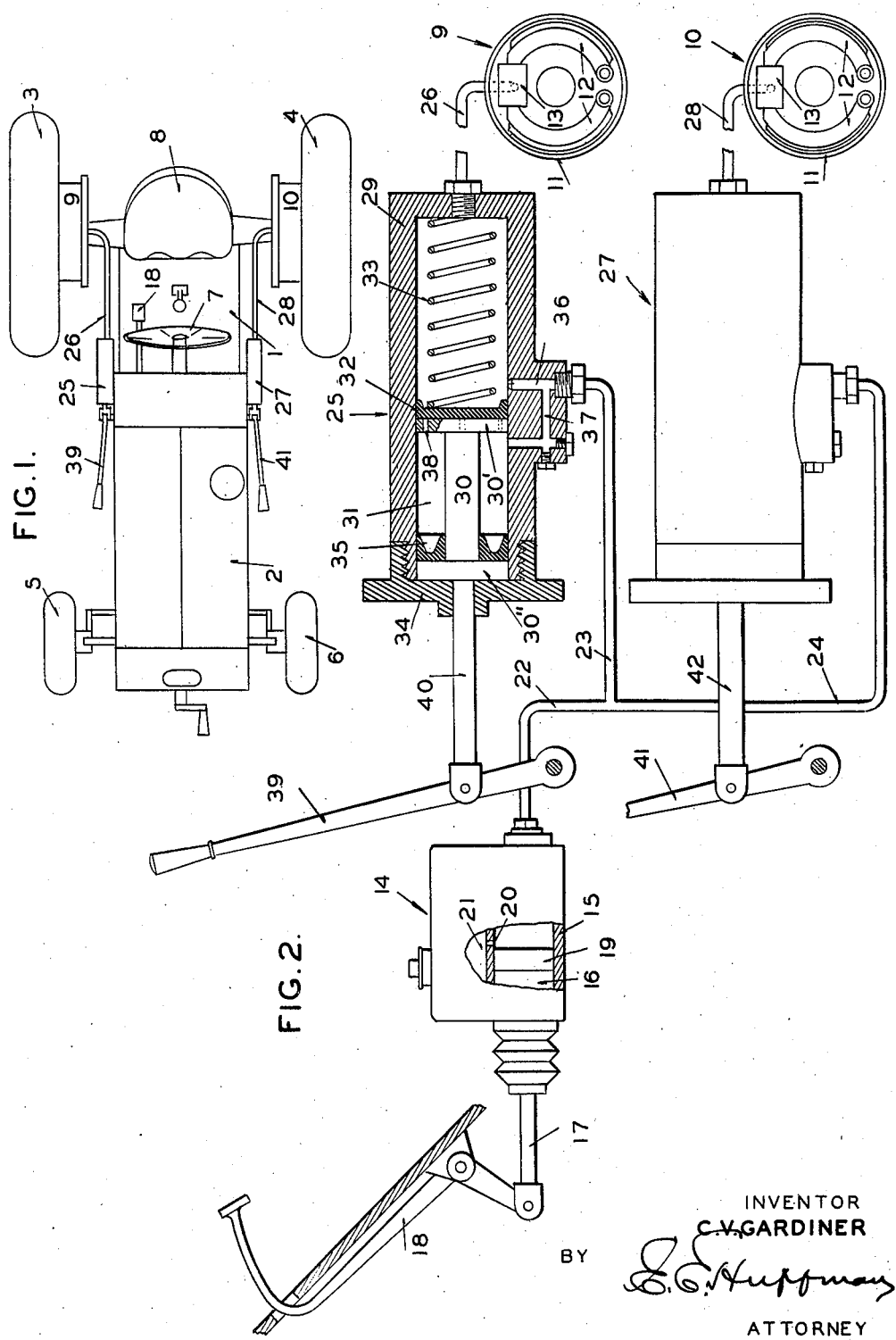
INVENTOR
C.V. GARDINER
BY
E. C. Huffman
ATTORNEY Patented Sept. 2, 1941

2,254,890

UNITED STATES PATENT OFFICE 2,254,890

BRAKING SYSTEM

Clarence V. Gardiner, Birmingham, Mich., assignor to Wagner Electric Corporation, St. Louis, Mo., a corporation of Delaware Application February 1, 1940, Serial No. 316,703

3 Claims. (Cl. 188—152)

My invention relates to braking systems and more particularly to a brake actuating system that is so constructed it can also be employed in steering a vehicle.

One of the objects of my invention is to produce a braking actuating system that will permit the braking assemblies to be operated simultaneously or individually.

Another and more specific object of my invention is to embody in a fluid pressure braking system, auxiliary pressure producing devices which can be operated independently of the main pressure producing device to thereby permit the braking assemblies to be operated independently.

Still another object of my invention is to provide an improved tractor vehicle braking system that can be employed to assist in steering.

Other objects of my invention will become apparent from the following description taken in connection with the accompanying drawing in which Figure 1 is a top view of a tractor vehicle having associated therewith my improved braking system for operating the brakes on the rear wheels thereof; and Figure 2 is a schematic view, partly in section, showing details of the braking system.

I have disclosed my invention as being embodied in a braking system for a tractor vehicle but it is to be understood that it may be embodied in any braking system where it is desired to brake certain wheels only. The tractor, as shown in Figure 1, comprises a frame 1 carrying an engine 2 for driving the rear wheels 3 and 4. The front wheels 5 and 6 are of the dirigible type and are employed in steering the tractor as desired, the control of the steering being by means of the steering wheel 7 positioned adjacent the operator's seat 8.

The two rear wheels only are provided with brakes and as shown in Figure 2, the brake assembly 9 for the right hand wheel 3 and the brake assembly 10 for the left hand wheel 4 each comprises a brake drum 11 having cooperating therewith pivoted shoes 12 actuated by a fluid motor 13 all of well-known construction.

The fluid motors of both brakes are adapted to be simultaneously actuated by a main pressure producing master cylinder device 14 mounted on the frame of the tractor. This master cylinder device is of known construction and comprises a cylinder 15 having reciprocable therein a piston 16 which is connected by a piston rod 17 with a pedal 18 positioned in a convenient place for operation by the foot of the operator. When piston 16 and its associated packing cup 19 are in their normally retracted position, the port 20 is uncovered for placing the cylinder in communication with a reservoir 21 to permit contraction and expansion of the fluid in a well-known manner.

The outlet of the master cylinder device is connected to a conduit 22 which communicates with branch conduits 23 and 24. The branch conduit 23 communicates by way of an auxiliary master cylinder device 25 and a conduit 26 with the fluid motor 13 of the brake assembly 9 on the right hand wheel. The branch conduit 24 communicates by way of a second auxiliary master cylinder device 27 and a conduit 28 to the fluid motor 13 of brake assembly 10 on the left hand wheel.

The two auxiliary master cylinder devices are of like construction and one only will be described in detail. By means of these auxiliary master cylinder devices, the brake assemblies 9 and 10 may be independently actuated without the necessity of operating the main master cylinder device 14 which is employed only when it is desired to operate both brakes simultaneously.

Each auxiliary master cylinder or device comprises a cylinder 29 within which is reciprocable a spool-type piston 30 which forms with the cylinder an annular chamber 31. The head 30' of the piston is provided with a packing cup 32 and interposed between this cup and the forward end of the cylinder is a spring 33 for normally biasing the piston to an inoperative position against the end 34 of the cylinder. There is also provided a cup 35 for sealing the chamber 31 and preventing fluid from leaking past the rear end 30'' of the piston. The cylinder 29 at a point just ahead of the packing cup 32 when the piston is in its retracted position, is provided with an inlet passage 36. A passage 37 places the chamber 31 in communication with the inlet passage 36. The piston head 30' is provided with passage 38 for permitting fluid to flow from the chamber 31 past the cup to the portion of the cylinder ahead of the piston in the event a sub-atmospheric pressure should be developed in the system during retractile movement of the piston. These passages also permit fluid to be forced by the piston by the main master cylinder device under certain conditions.

The forward end of the cylinder of the auxiliary master cylinder device 25 is connected to the conduit 26 leading to the fluid motor of the right hand brake assembly 9 and the inlet passage 36 is connected to communicate directly with the branch passage 23 leading from the main master cylinder device 14. The forward end of the cylinder of the auxiliary master cylinder device 27 is connected to the conduit 28 leading to the fluid motor of the left hand brake assembly 10 and the inlet passage 36 thereof is connected to communicate with the branch conduit 24.

The auxiliary master cylinder device 25 is mounted on the right hand side of the frame of the tractor and the auxiliary master cylinder device 27 is mounted on the left hand side of the frame of the tractor. The auxiliary device 25 is operated by a hand lever 39 pivotally mounted on the tractor frame and connected to the piston of the auxiliary device by piston rod 40. The auxiliary device 27 is operated by a hand lever 41 pivotally mounted on the frame and connected to the piston by a piston rod 42. The levers 39 and 41 extend upward along side the frame of the vehicle in such a position that the lever 39 may be readily grasped by the right hand of the vehicle operator and the lever 41 by the left hand of the vehicle operator.

In operation, the system is filled with a suitable operating fluid and the pistons 30 of the auxiliary master cylinder devices are normally held by the springs in their retracted or inoperative position as shown in Figure 2. Under these conditions the main master cylinder device 14 will be in direct communication with the fluid motors 13 of the two brake assemblies, since each piston 30 is positioned rearward of the inlet passage 36. The two brake assemblies may be applied and released simultaneously by operation of the main master cylinder device 14, such operation being performed by the foot of the vehicle operator.

If it is desired to make a short turn with the tractor, this may be accomplished by the use of one of the auxiliary master cylinder devices. To turn to the right the dirigible wheels 5 are turned sharply in this direction and the right hand lever 39 grasped and moved by the right hand to operate the auxiliary master cylinder device 25. This will cause the piston 30 thereof to be moved in the cylinder and past the inlet passage 36 to thus develop fluid pressure and operate the fluid motor 13 to apply the right brake. The right hand wheel only will now be held and as the result thereof the vehicle can be propelled about this wheel as an axis.

If it is desired to turn in a left hand direction, the dirigible wheels 5 and 6 are turned sharply in this direction and the lever 41 grasped and the auxiliary master cylinder device 27 actuated to apply only the left hand brake assembly.

If one of the auxiliary master cylinder devices should be in an operative position at the time it is desired to apply both brakes, this can be accomplished by merely operating the main master cylinder device 14. The fluid pressure developed by the main master cylinder device will be forced past the piston head 30' of the operated auxiliary device by way of the passages 38. After the main master cylinder device is operated it will not be necessary to continue to operate the auxiliary master cylinder device by the hand lever.

It is to be noted in connection with the braking system that the auxiliary master cylinder devices are each operable independently of the main master cylinder device and therefore during turning it will not be necessary to operate the main master cylinder device in any way. If it should be desired to apply the two braking assemblies with different pressures this may be accomplished by operating the auxiliary pressure producing devices so as to cause different pressures to be developed.

It is also to be noted that the auxiliary pressure producing devices are so constructed that there is no possibility of a sub-atmospheric pressure being developed in the braking system by a quick retractable movement of either piston 30, since the chamber 31 behind the piston head 30' is always filled with fluid. If any sub-atmospheric pressure should develop ahead of the piston, fluid will flow past the piston and the cup to prevent this from happening.

The entire braking system is simple in construction and very easy to operate. The levers 39 and 41 are conveniently positioned for grasping by the hands of the operator. Because of the position of the levers there is no possibility of the operator not readily knowing which lever operates which brake assembly. By operating the right hand lever the right hand brake assembly will be actuated and by operating the left hand lever the left hand brake assembly will be actuated.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure braking system, two braking assemblies each including an actuating fluid motor, a main fluid pressure producing device, conduit means connecting the main pressure producing device with each fluid motor, and an auxiliary pressure producing device associated with each braking assembly, each auxiliary device comprising a cylinder in communication with the fluid motor of the brake assembly with which it is associated, a piston reciprocable therein and having a normally inoperative position, means for actuating the piston, an inlet port for the cylinder at a point positioned just forward of the piston when it in its inoperative position, and conduit means for connecting the inlet port to the main pressure producing device, said port and last named conduit means permitting free flow of fluid to and from the cylinder and main pressure producing device when the piston is in inoperaitve position.

2. In a fluid pressure braking system, two braking assemblies, each including an actuating fluid motor, a main fluid pressure producing device, conduit means connecting the main pressure producing device with each fluid motor, and an auxiliary pressure producing device associated with each braking assembly, each of said auxiliary devices comprising a cylinder in communication with the fluid motor of the brake assembly it operates, two inter-connected spaced apart pistons reciprocable in said cylinder, a spring for maintaining said pistons in a retracted position at one end of the cylinder, means for permitting fluid to flow past the forward piston to the cylinder ahead of it but not in the opposite direction, means for placing the main pressure producing device in communication with the cylinder at a point between the pistons and also at a point just forwardly of the forward piston when the pistons are in the retracted positions, said means comprising spaced ports in the cylinder wall, and means for operating the piston so as to cause the forward piston to cut off communication with the main pressure producing device and to apply pressure to the fluid in the cylinder.

3. In a fluid pressure braking system for a tractor vehicle provided with a frame, a steering wheel, and with a driving member on each side of the frame, a braking assembly for each driving member and including a fluid motor, a main pedal operated pressure producing device, conduits connecting each motor with the main pressure producing device, two auxiliary pressure producing devices, one of said auxiliary devices being mounted separately from the main pressure producing device on one side of the vehicle frame and associated with the conduit leading to the fluid motor of the braking assembly on the same side and capable of applying pressure to said fluid motor independently of the main pressure producing device, said other auxiliary device also being mounted separately from the main pressure producing device but on the other side of the vehicle frame and associated with the conduit leading to the fluid motor of the brake assembly on that side of the vehicle frame and capable of applying pressure to said fluid motor independently of the main pressure producing device, and a hand operated lever for operating each auxiliary device independently of the other, each hand operated lever being mounted adjacent and on the same side of the frame as the auxiliary device it operates so that the right hand of the operator can conveniently grasp the lever on his right and the left hand of the operator can conveniently grasp the lever on his left when he is positioned on the vehicle facing forwardly.

CLARENCE V. GARDINER.